United States Patent [19]

Saiia

[11] Patent Number: 4,653,256
[45] Date of Patent: * Mar. 31, 1987

[54] APPARATUS FOR ESTABLISHING REEL-TO-BEDKNIFE CLEARANCE

[75] Inventor: Anthony J. Saiia, Racine, Wis.

[73] Assignee: Textron Inc., Providence, R.I.

[*] Notice: The portion of the term of this patent subsequent to Aug. 19, 2003 has been disclaimed.

[21] Appl. No.: 798,373

[22] Filed: Nov. 15, 1985

[51] Int. Cl.$^4$ ............................................. A01O 55/20
[52] U.S. Cl. ..................................... 56/249; 56/11.9; 241/222
[58] Field of Search ................ 56/11.9, 12.1, 249–252, 56/10.2; 241/37, 222, 63, 64

[56] References Cited

U.S. PATENT DOCUMENTS

| | | |
|---|---|---|
| 2,789,712 | 4/1957 | Christensen . |
| 2,896,390 | 7/1959 | Cunningham .......................... 56/249 |
| 3,106,813 | 10/1963 | Strasel . |
| 3,187,492 | 6/1965 | Bergen . |
| 3,685,265 | 8/1972 | Horowitz et al. . |
| 4,335,569 | 6/1982 | Keeney . |
| 4,345,419 | 8/1982 | Chandler . |
| 4,516,388 | 5/1985 | Chandler . |
| 4,606,178 | 8/1986 | Saiia ....................................... 56/249 |

Primary Examiner—Robert Peshock
Assistant Examiner—John G. Weiss
Attorney, Agent, or Firm—Arthur J. Hansmann

[57] ABSTRACT

A lawn mower having a cutting reel and a bedknife as its cutting elements, and with those elements being adjustable toward and away from each other for establishing cutting clearance. A hydraulic system is utilized for establishing the pre-selected clearance and for ultimately setting that clearance and maintaining it.

10 Claims, 2 Drawing Figures

APPARATUS FOR ESTABLISHING REEL-TO-BEDKNIFE CLEARANCE

This invention relates to apparatus for establishing reel-to-bedknife clearance in a lawn mower.

BACKGROUND OF THE INVENTION

The prior art is already aware of various apparatus for adjusting the clearance between the reel and a bedknife in a lawn mower. In some instances, the bedknife is the movable member, and, in other instances, the reel is the movable member. For instance, in U.S. Pat. No. 3,187,492, the bedknife is movable through a threaded adjustment for establishing the position of the bedknife relative to the reel. Also, U.S. Pat. No. 3,106,813 shows the adjustment of the bedknife relative to the reel. U.S. Pat. No. 3,685,265 and U.S. Pat. No. 4,345,419 show movement of the reel relative to the bedknife. Further, U.S. Pat. No. 4,516,388 shows the application of hydraulics for moving the bedknife relative to the reel to establish the clearance therebetween. Also, U.S. Pat. No. 2,789,712 shows hydraulic apparatus for positioning a tractor shovel. U. S. Pat. No. 4,335,569 uses monitoring means.

The present invention differs from the prior art in that it provides for an adjustment of one of the two elements in the reel and bedknife arrangement, whereby the adjustment is accurate and readily accomplished and can be made according to a desired or selected clearance. In the specific embodiment disclosed herein, the adjustment is accomplished through the use of a fluid acuated assembly, which may be either pneumatic or hydraulic.

In achieving the adjustment through the use of this invention, one can select the desired clearance, in the field, and the two cutting elements are then brought into contact. The desired clearance is then established, as selected, and further actuation of the apparatus will then automatically move the cutting elements into their clearance position, as desired. That is, the present invention provides for a ready and easy selection for the desired amount of clearance between the cutting elements, and thus the accurate and desired clearance can be selected and established, in the field. Further, the present invention provides that the cutting elements can be readily released from their set position relative to each other, for purposes of sharpening the cutting elements or for any other purpose.

The present invention provides for minute dimensional adjustments, such as 0.001 to 0.003 inches, to provide for the optimum adjustment of the cutting elements and to avoid excessive wear between the respective cutting edges and yet assure that the grass will be well mowed.

Still further, the present invention provides for apparatus whereby one can set the clearance between the cutting elements and do so in a manner independent of utilizing a specific displacement of a certain quantity of hydraulic fluid.

DETAILED DESCRIPTION OF THE PREFERRED EMBODIMENT

Figure 1:
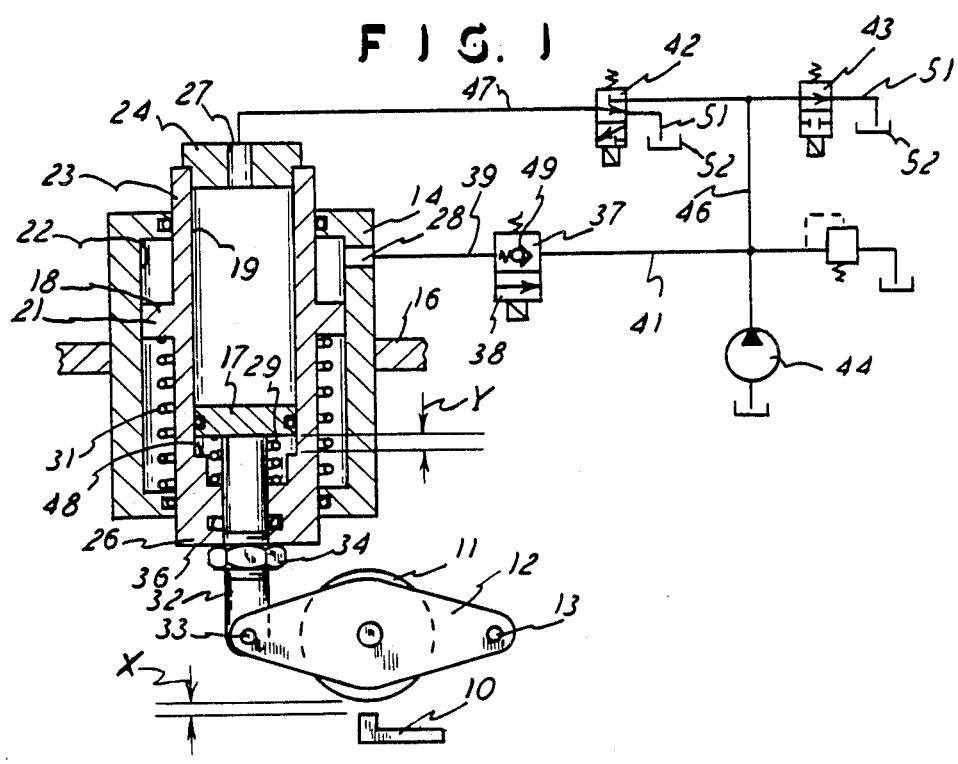
FIG. 1 is a diagrammatic sectional view of an embodiment of this invention.

The drawings show at least a portion of a lawn mower having a suitably mounted bedknife 10 and a rotatably mounted reel 11 which rotates relative to the bedknife 10 for cutting the grass therebetween. The reel 11 is shown mounted on a support plate 12 which can be pivotal on the mower by means of a pin 13. Thus, as shown, the reel 11 can be pivoted up-and-down, around the pin or shaft 13. However, it will be also understood that the bedknife 10 could be the pivotally mounted element of the mower cutters which therefore have the two cutting elements 10 and 11. Whichever of the two elements 10 or 11 is pivotal or movable, toward and away from the other, it is to be understood that the desirability is to have a clearance, such as a clearance "X" established between the two elements for optimum operation and cutting action, though that clearance is of a very minute amount, such as that mentioned at the outset hereof.

FIG. 1 further shows a hydraulic system for establishing the clearance "X", and the system includes a housing 14 suitably mounted on the mower framepiece 16, for instance, so that the housing 14 is fixed relative to the lawn mower. The housing 14 is that of a fluid assembly, and it may be either for pneumatics or hydraulics, and it encloses two fluid actuated pistons 17 and 18 which are telescopically related, as shown. That is, the piston member 18 has an interior bore 19 which slidably receives the inner piston 17. Also, the piston 18 has its annular portion 21 slidably disposed within the cylindrical opening 22 of the housing 14. The piston 18 also has a cylindrical wall 23 which is coaxial with the cylindrical bore 22 of the housing 14. The opposite ends of the piston 18 are closed off, such as by the cap 24 and the lower end 26, as shown, and thus the piston interior 19 is fluid tight, except for the fluid passageway 27. That is, the various O-rings are employed, as shown, for rendering the entire system fluid tight.

The housing 14 also has a fluid passageway 28 extending therethrough to its interior bore 22, and the bore 28 is shown above the piston annular portion 21, for a purpose mentioned later.

The piston 17 has a compression spring 29 underneath it and urging it upwardly, and the piston 18 has a compression spring 31 underneath it and urging it upwardly. A piston rod or link 32 extends from its connection with piston 17 and downwardly to connect with the pivotal bracket 12, by means of a pivot pin 33. The rod 32 is threaded, and a jam nut 34 is threaded thereon, to serve as a stop, when the nut 34 is upwardly in abutment with the surface 36 of the piston 18.

As shown in FIG. 1, the system is shown to be hydraulic, though, as mentioned, it could be pneumatic. In operation, to obtain a desirable maximum clearance between the reel and bedknife, for purposes of maintenance or re-setting the clearance between the two, a fluid valve 37 is actuated to vent fluid from above the piston portion 21, that is when the valve passageway 38 is aligned with the fluid line 39 and 41. That allows the spring 31 to force the piston 18 upwardly. A pre-determined clearance between the reel 11 and bedknife 10 can be established, as a function of the geometry of the parts shown, by adjusting the jam nut 34 relative to the piston 17 which is also be urged upwardly by the spring 29. That sets the clearance "X", and it can be seen and understood that if the jam nut 34 is fully tightened on the rod 32 and is then against the surface 36, the clearance "X" would be zero.

To automatically set this adjustment between the bedknife 10 and reel 11, valve 37 is positioned as shown in the drawing, and valves 42 and 43 are actuated so that a fluid flows from the pump 44 and into the line 46 and through the valve 42 and into the line 47 and to the opening 27. The fluid pressure in the chamber 19 forces the piston 17 downwardly inside the piston 18 by the distance designated "Y". When the piston 17 bottoms on the circular shoulder 48 of the piston 18, the increase in the fluid pressure in the chamber 19 causes a similar increase in the line 41 to thus open a check valve 49 in the valve 37 and thereby allow fluid to flow into the line 39 and into the bore 22 forcing the piston 18 downwardly until the reel 11 comes into contact with the bedknife 10.

Figure 2:
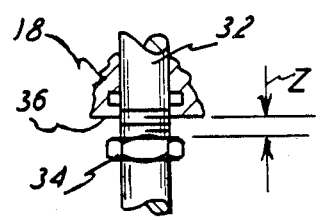
FIG. 2 is a view of a fragment of FIG. 1, with parts thereof in a different position.

At that time, as seen in FIG. 2, a clearance "Z" could be established between the jam nut 34 and the piston under surface 36. Then, upon actuating valves 42 and 43, the pressure in the bore 19 can be vented to the line 51 and to the reservoir 52. That allows the piston 17 to move upwardly, under the force of the spring 29, and thereby establish the clearance "Y". Also, with that corresponding decrease in the fluid pressure in the line 41, the check valve 49 closes and thus holds the fluid in the bore 22 to thus hold the piston 18 in its downward position. Accordingly, the holding of the piston 18 downwardly, as mentioned and the rising of the piston 17, will create that clearance "Y" which is also the clearance "X" which is desired.

In this arrangement, the clearance desired, namely, "X", is established by hydraulic means. However, the system does not depend upon a certain quantity of hydraulic fluid to flow, in order to establish the clearance. Also, the clearance can be pre-selected by means of adjustably setting the threaded lock nut 34 relative to the surface 36, as mentioned. Still further, there is only a single housing 14 which encloses the two pistons 17 and 18 which are telescoped together and are movable relative to each other for the adjustment mentioned. Also, when the jam nut 34 is in its lowered or loosest position, then the reel 11 can be moved to maximum clearance with the bedknife 10, for purposes of maintenance, such as sharpening the respective cutting edges on the bedknife 10 and the reel 11.

What is claimed is:

1. In a lawn mower having cutting elements of a mower reel and a bedknife to be positioned with a cutting clearance therebetween, the improvement comprising means for adjustably mounting one of said elements for movements into contact with and away from the other of said elements, a fluid actuated assembly, said assembly including two parts movable relative to each other and toward and away from the other of said elements, an interconnection connected between one of said two parts and said one element for transmitting movement of said one part to said one element, means for releasably restraining the other of said two parts in a selected position relative to said other element, and a stop operatively interposed between said two parts for restricting movement of said one part away from said other element to establish cutting clearance between said elements.

2. The lawn mower with the improvement, as claimed in claim 1, wherein said fluid actuated assembly includes an enclosure of a single housing which encloses said two parts and is mounted on said mower.

3. The lawn mower with the improvement, as claimed in claim 1, wherein said two parts consist of two separate pistons, and said interconnection is a piston rod.

4. The lawn mower with the improvement, as claimed in claim 2, wherein said two parts consist of two separate pistons, within said enclosure, and said interconnection is a piston rod extending from said enclosure.

5. The lawn mower with the improvement, as claimed in claim 4, wherein said two pistons are telescoped together whereby the movement of the outer piston influences the axial position of the inner piston.

6. The lawn mower with the improvement, as claimed in claim 1, including a spring operative on each of said two parts for yieldingly urging said parts away from said other element.

7. The lawn mower with the improvement, as claimed in claim 4, including a spring operative on each of said two pistons for yieldingly urging said pistons away from said other element.

8. The lawn mower with the improvement, as claimed in claim 1, wherein said means for releasably restraining the other of said two parts is a fluid operated means having influence on the position of the other of said two parts.

9. The lawn mower with the improvement, as claimed in claim 1, wherein said stop is disposed external of said assembly and is adjustable relative to said assembly, for establishing the desired clearance between said elements by adjustably setting said stop away from said assembly prior to moving said one part away from said other element.

10. The lawn mower with the improvement, as claimed in claim 1, wherein said stop is a threaded element disposed external of said assembly and is threadedly adjustable relative to said assembly, for establishing the desired clearance between said elements by adjustably setting said stop away from said assembly prior to moving said one part away from said other element.

* * * * *